(12) United States Patent
O'Brien, Jr.

(10) Patent No.: US 7,075,993 B2
(45) Date of Patent: Jul. 11, 2006

(54) CORRECTION SYSTEM AND METHOD FOR ENHANCING DIGITAL VIDEO

(75) Inventor: Royal O'Brien, Jr., Jacksonville, FL (US)

(73) Assignee: Digital Interactive Streams, Inc., Jacksonville, FL (US)

( * ) Notice: Subject to any disclaimer, the term of this patent is extended or adjusted under 35 U.S.C. 154(b) by 348 days.

(21) Appl. No.: 10/171,317

(22) Filed: Jun. 12, 2002

(65) Prior Publication Data

US 2002/0191701 A1    Dec. 19, 2002

Related U.S. Application Data

(60) Provisional application No. 60/297,603, filed on Jun. 12, 2001.

(51) Int. Cl.
    *H04B 1/66*    (2006.01)
(52) U.S. Cl. .................... 375/240.27; 375/240.25; 375/375.26; 375/240.2; 382/233; 382/266; 382/268; 382/250; 382/269
(58) Field of Classification Search ........... 375/240.27, 375/240.26, 240.25, 240.01, 240.2; 382/268, 382/266, 254, 269, 233, 250
    See application file for complete search history.

(56) References Cited

U.S. PATENT DOCUMENTS

| | | | |
|---|---|---|---|
| 5,012,329 A | 4/1991 | Lang et al. | |
| 5,253,078 A | 10/1993 | Balkanski et al. | |
| 5,509,111 A | 4/1996 | Hong et al. | |
| 5,590,064 A | 12/1996 | Astle | |
| 5,694,492 A | 12/1997 | Kim | |
| 5,748,795 A | 5/1998 | Ohnishi et al. | |
| 5,757,969 A | 5/1998 | Kim | |
| 5,787,203 A | 7/1998 | Lee et al. | |
| 5,796,875 A | 8/1998 | Read | |
| 5,812,787 A | 9/1998 | Astle | |
| 5,819,035 A | 10/1998 | Devaney et al. | |
| 5,821,991 A | 10/1998 | Kwok | |
| 5,850,294 A | 12/1998 | Apostolopoulos et al. | |
| 5,852,682 A | 12/1998 | Kim | |
| 5,870,497 A | 2/1999 | Galbi et al. | |
| 5,905,504 A | 5/1999 | Barkans et al. | |
| 5,920,356 A | 7/1999 | Gupta et al. | |
| 5,940,544 A | 8/1999 | Nako | |
| 5,973,740 A | 10/1999 | Hrusecky | |
| 5,974,196 A | 10/1999 | Chang et al. | |
| 6,040,879 A * | 3/2000 | Park | 375/240.27 |
| 6,041,145 A | 3/2000 | Hayashi et al. | |
| 6,075,572 A | 6/2000 | Asami | |
| 6,115,503 A | 9/2000 | Kaup | |
| 6,157,936 A | 12/2000 | Margulis et al. | |

(Continued)

FOREIGN PATENT DOCUMENTS

EP    0 447 203 A2    3/1991

(Continued)

OTHER PUBLICATIONS

Gims S. Philippe for Karen L. Ward, PCT International Search Report, pp. 1-3.

(Continued)

*Primary Examiner*—Shawn S. An
(74) *Attorney, Agent, or Firm*—Mark J. Young

(57) ABSTRACT

A system and methodology assesses whether an error correction should be applied to detected blocks based on determined correction application criteria, and, if warranted according to the assessment, applies block-specific error corrections to detected blocks. Global error corrections, such as edge corrections, are also enabled.

8 Claims, 16 Drawing Sheets

U.S. PATENT DOCUMENTS

| | | | |
|---|---|---|---|
| 6,163,346 | A | 12/2000 | Tsyrganovich |
| 6,175,592 | B1 | 1/2001 | Kim et al. |
| 6,175,596 | B1 | 1/2001 | Kobayashi et al. |
| 6,181,822 | B1 | 1/2001 | Miller et al. |
| 6,222,881 | B1 | 4/2001 | Walker |
| 6,240,135 | B1 * | 5/2001 | Kim ..................... 375/240.01 |
| 6,317,522 | B1 * | 11/2001 | Rackett ..................... 382/268 |
| 6,320,905 | B1 | 11/2001 | Konstantinides |
| 6,333,951 | B1 | 12/2001 | Tamura et al. |
| 6,173,077 | B1 | 1/2002 | Trew et al. |
| 6,389,177 | B1 | 5/2002 | Chu et al. |

FOREIGN PATENT DOCUMENTS

| | | |
|---|---|---|
| EP | 0 769 878 A2 | 10/1996 |
| EP | 0 781 053 A2 | 12/1996 |
| EP | 0 886 444 A2 | 6/1998 |

OTHER PUBLICATIONS

M. Robertson and R. Stevenson, DCT Quantization Noise in Compressed Images (2001), International Conference on Image Processing 2001, Thessloniki, Greece "citeseer.nj.nec.com/374453.html", pp. "185-188".

C. Segall and A. Katsaggelos, Pre- and Post-Processing Algorithms for Compressed Video Enhancement (2000), ciiteseer.nj.nec.com/segal100pre.html, Proceedings of the Thirty-Fourth Asilomar Conference on Signals, Systems and Computers, Oct. 29-Nov. 1, 2000.

N. Giang and D. Saupe, Adaptive Post-Processing for Fractal Image Compression, "ICIP00", year "2000", pp. "TA06.08".

Nam Ik Cho, Bong Gyun Roh and Sang Uk Lee, "Reduction of blocking artifacts by a modeled lowpass filter output," IEEE ISCAS2000, Geneva, Switzerland, May 2000.

J.K. SU and R.M. Mersereau, "Post-Processing for Artifact Reduction in JPEG-Compressed Images," Proc, IEEE Intl. Conf. on Acoustics, Speech, and Signal Processing '95 (ICASSP '95), vol. 4, pp. 2363-2366, Detroit, MI, USA, May 1995.

T. Meier, K. Ngan and G. Crebbin, "Reduction of Blocking Artifacts in Image and Video Coding," IEEE Transactions on Circuits and Systems for Video Technoloby, vol. 9, No. 3, Apr. 1999.

A. Watson, G. Yang, J. Solomon and J. Villasenor, "Visual Thresholds for Wavelet Quantization Error," SPIE Proceedings vol. 2657, paper #44, Human Vision and Electronic Imaging, B. Rogowitz and J. Allebach, Ed., The Society for Imaging Science and Technology, (1996).

A. Watson, "Perceptual Optimization of DCT Color Quantization Matrices," Proceedings of the IEEE International Conference on Image Processing. Austin, TX, Nov., 1994, IEEE Computer Society Press, pp. 100-104.

H. Choi and T. Kim, "Blocking-Artifact Reduction i nBlock-Coded Images Using Wavelet-Based Subband Decomposition," IEEE Transactions on Circuits and Systems for Video Technology, vol. 10, No. 5, Aug. 2000, pp. 801-805.

S. Panis, R. Kutka and A. Kaup, "Reduction of Block Artifacts by Selective Removal and Reconstruction of the Block Borders," Proc. 1997 Picture Coding Symposium, Berlin, Sep. 10-12, 1997, pp. 705-708.

M. Robertson and R. Stevenson, "Reducing the Complexity of Iterative Post-Processing of Video," Midwest Symposium on Circuits and Systems, University of Notre Dame, Notre Dame, IN 1998, pp. 399-402, Aug. 9-12, 1998.

* cited by examiner

|   |   |   |   | L |   |   |   |   |   |   |   | R |   |   |   |
|---|---|---|---|---|---|---|---|---|---|---|---|---|---|---|---|
| 0,0 | 1,0 | 2,0 | 3,0 | 4,0 | 5,0 | 6,0 | 7,0 | 0,0 | 1,0 | 2,0 | 3,0 | 4,0 | 5,0 | 6,0 | 7,0 |
| 0,1 | 1,1 | 2,1 | 3,1 | 4,1 | 5,1 | 6,1 | 7,1 | 0,1 | 1,1 | 2,1 | 3,1 | 4,1 | 5,1 | 6,1 | 7,1 |
| 0,2 | 1,2 | 2,2 | 3,2 | 4,2 | 5,2 | 6,2 | 7,2 | 0,2 | 1,2 | 2,2 | 3,2 | 4,2 | 5,2 | 6,2 | 7,2 |
| 0,3 | 1,3 | 2,3 | 3,3 | 4,3 | 5,3 | 6,3 | 7,3 | 0,3 | 1,3 | 2,3 | 3,3 | 4,3 | 5,3 | 6,3 | 7,3 |
| 0,4 | 1,4 | 2,4 | 3,4 | 4,4 | 5,4 | 6,4 | 7,4 | 0,4 | 1,4 | 2,4 | 3,4 | 4,4 | 5,4 | 6,4 | 7,4 |
| 0,5 | 1,5 | 2,5 | 3,5 | 4,5 | 5,5 | 6,5 | 7,5 | 0,5 | 1,5 | 2,5 | 3,5 | 4,5 | 5,5 | 6,5 | 7,5 |
| 0,6 | 1,6 | 2,6 | 3,6 | 4,6 | 5,6 | 6,6 | 7,6 | 0,6 | 1,6 | 2,6 | 3,6 | 4,6 | 5,6 | 6,6 | 7,6 |
| 0,7 | 1,7 | 2,7 | 3,7 | 4,7 | 5,7 | 6,7 | 7,7 | 0,7 | 1,7 | 2,7 | 3,7 | 4,7 | 5,7 | 6,7 | 7,7 |

| 50 | 50 | 50 | 50 | 50 | 50 | 50 | 50 | 100 | 100 | 100 | 100 | 100 | 100 | 100 | 100 |

1110

| 50 | 50 | 50 | 50 | 50 | 50 | 50 | 75 | 75 | 100 | 100 | 100 | 100 | 100 | 100 | 100 |

A1

1120

| 50 | 50 | 50 | 50 | 50 | 62 | 50 | 75 | 75 | 100 | 87 | 100 | 100 | 100 | 100 | 100 |

A3L, A3R

1130

| 50 | 50 | 50 | 50 | 50 | 62 | 68 | 75 | 75 | 81 | 87 | 100 | 100 | 100 | 100 | 100 |

A2L, A2R

1140

| 50 | 50 | 50 | 50 | 56 | 62 | 68 | 75 | 75 | 81 | 87 | 93 | 100 | 100 | 100 | 100 |

| 40 | 40 | 40 | 40 | 40 | 40 | 40 | 40 |
|----|----|----|----|----|----|----|----|
| 40 | 40 | 40 | 40 | 40 | 40 | 40 | 40 |
| 40 | 40 | 40 | 40 | 40 | 40 | 40 | 40 |
| 40 | 40 | 40 | 40 | 40 | 40 | 40 | 40 |
| 40 | 40 | 40 | 40 | 40 | 40 | 40 | 40 |
| 40 | 40 | 40 | 40 | 40 | 40 | 40 | 40 |
| 40 | 40 | 40 | 40 | 40 | 40 | 40 | 40 |
| 40 | 40 | 40 | 40 | 40 | 40 | 40 | 40 |

| 50 | 50 | 50 | 50 | 50 | 50 | 50 | 50 | 45 | 42 | 41 | 40 | 40 | 40 | 40 | 40 |
|----|----|----|----|----|----|----|----|----|----|----|----|----|----|----|----|
| 50 | 50 | 50 | 50 | 50 | 50 | 50 | 50 | 47 | 44 | 42 | 41 | 40 | 40 | 40 | 20 |
| 50 | 50 | 50 | 50 | 50 | 50 | 50 | 50 | 48 | 46 | 44 | 42 | 41 | 40 | 20 | 20 |
| 50 | 50 | 50 | 50 | 50 | 50 | 50 | 50 | 49 | 47 | 45 | 43 | 42 | 20 | 20 | 20 |
| 50 | 50 | 50 | 50 | 50 | 50 | 50 | 50 | 49 | 48 | 46 | 44 | 20 | 20 | 20 | 20 |
| 50 | 50 | 50 | 50 | 50 | 50 | 50 | 50 | 49 | 48 | 47 | 20 | 20 | 20 | 20 | 20 |
| 50 | 50 | 50 | 50 | 50 | 50 | 50 | 50 | 49 | 48 | 20 | 20 | 20 | 20 | 20 | 20 |
| 50 | 50 | 50 | 50 | 50 | 50 | 50 | 50 | 49 | 20 | 20 | 20 | 20 | 20 | 20 | 20 |

Figure 16

CORRECTION SYSTEM AND METHOD FOR ENHANCING DIGITAL VIDEO

PROVISIONAL APPLICATION

This application claims priority to U.S. Provisional Application 60/297,603, filed Jun. 12, 2001, the entire contents of which are hereby incorporated by reference herein.

FIELD OF THE INVENTION

The present invention relates generally to processing digital video data, and in particular to a system and method for real-time enhancement of decoded digital video data to reduce artifacts and improve clarity of resolution and display.

BACKGROUND

Bandwidth constraints of conventional broadcast network structures limit the ability to effectively deliver digital video. For example, standard dial-up connections over copper telephone wire, which connect most residential consumers to a broadcast network, are incapable of efficiently delivering the massive amounts of information required for full-screen streaming video. Even broadband cable and digital subscriber lines face challenges in meeting the demands of streaming video.

To illustrate the challenge, a broadcast video may have 640 lines of horizontal resolution, and 480 vertical lines of resolution for a total of 307,200 pixels. The colors of each pixel may be represented as a 3 character (byte) number (24 bit) having a Red, Green, and Blue (or YUV) value ranging from 0–255, for 16,777,216 ($256^3$) possible colors. Thus, it takes 640×480×3=921,600 distinct characters to produce 307,200 distinct pixels for 1 image on a screen. Multiplying the number of distinct characters by the average number of images shown per second to produce a video (29.97 images per second for NTSC video, and 24 for film) yields 921,600×24=22,118,400 characters per second for film, and 921,600×29.97=~27,620,352 characters per second for NTSC video. Converting the characters to bits, with 8 bits to each character (byte), drives the number up to 176,947,200 bits per second for film and 220,962,816 for NTSC video. Thus, even under ideal conditions, a 100 Megabit Ethernet network would not be able to transmit the data at the required rate. Given these realities, video data is typically compressed before transmission.

The Motion Picture Experts Group (MPEG) has embraced various well-known video encoding standards or processes, including MPEG-1, MPEG-2, and MPEG-4, which utilize similarities between successive image frames, referred to as temporal or inter-frame correlation, to provide inter-frame compression in which pixel-based representations of image frames are converted to motion representations. Similarities within image frames, referred to as spatial or intra-frame correlation, are also used to provide intra-frame compression in which the motion representations within an image frame are further compressed. The basic approach divides the image into blocks and then individually transforms each block. Compression is realized by quantizing transform coefficients.

Such encoding techniques are calculation-intensive and include a high probability for error introduction, particularly during quantization steps of the encoding process. Especially at high compression ratios, block-based MPEG encoding leads to noticeable blocking artifacts, i.e., artificial discontinuities that appear between the boundaries of blocks. During decompression, a decoder reverses the encoding process, but the encoded errors remain. These propagated errors in the decoded video image are commonly referred to as artifacts, which are responsible for undesirable video image effects such as "mosaic" effect, distortion, mosquito noise, ringing noise and the like.

Some errors may derive from original source video. For example, the video may include undesired shifts in color or brightness for the same pixels representative of the same image between successive frames. Such shifts may be captured in the encoding process and propagated in the decoded data. This type of error is generally referred to as a standing block error herein.

To reduce such undesirable video image effects introduced during quantization, some filtering techniques have emerged. They typically entail averaging, interpolating or extrapolating between temporally and spatially adjacent pixel values to provide blending or smoothing. Many of these techniques address only one or a few types of errors. Additionally, these techniques tend to take a global approach, adjusting all data that falls within determined thresholds. Such indiscriminate processing often results in undesirable changes and unnecessary computations, making them unsuitable for real-time applications. Furthermore, these techniques do not emphasize computational efficiency, making them unsuitable for processing the massive amounts of data required for real-time application on commercial off-the-shelf computing equipment used by consumers today.

SUMMARY

It is therefore an object of the present invention to provide a decoded video data enhancement system and methodology.

It is another object of the present invention to provide a decoded video data enhancement system and methodology that is capable of correcting various types of errors.

IT is yet another object of the invention to provide a decoded video data enhancement system and methodology that efficiently detects blocks of data conducive to error and selectively applies determined correction methodologies to detected blocks that meet determined threshold criteria.

It is a further object of the invention to provide a decoded video data enhancement system and methodology that employs binary arithmetic and leverages processor-specific register sets, while avoiding floating point calculations, to improve computational efficiency.

To achieve these and other objects, a method for determining if a target block of decoded video data comprised of pixel values is a source of an artifact is disclosed. In an exemplary implementation, the method is comprised of the steps of comparing values of determined pixels from the target block with pixels values from one or more reference blocks, said reference blocks being likely sources of artifacts, and assessing whether the compared values reveal substantial identity between the target block and a reference block.

A method is also disclosed for enhancing digital video. In an exemplary implementation the method includes identifying one or more target blocks of decoded video data that are possible sources of an artifact, and determining whether a block-specific error correction should be applied, and, if so, applying a block-specific error correction to correct the artifact attributed to each target block of decoded video that is identified as a source of an artifact.

A system for enhancing digital video is also disclosed. The system is comprised of means for identifying one or more target blocks of decoded video data that are possible sources of artifacts, means for determining whether a block-specific error correction should be applied, and means for applying a block-specific error correction to correct artifacts attributed to each target block of decoded video that is identified as a source of an artifact.

BRIEF DESCRIPTION OF THE DRAWINGS

The foregoing and other objects, features and advantages of the present invention will become better understood with reference to the following description, appended claims, and accompanying drawings, where:

FIG. 10 conceptually depicts two adjacent side-by-side 8×8 blocks of pixels for purposes of illustrating a block-specific correction for adjacent detected blocks in accordance with an exemplary implementation of the present invention;

FIG. 11 conceptually depicts exemplary steps of a block-specific correction for a row of pixels in adjacent side-by-side detected blocks in accordance with a preferred implementation of the present invention;

FIG. 12 conceptually depicts two diagonal 8×8 blocks for purposes of illustrating a block-specific correction implemented for diagonal detected blocks in accordance with an exemplary implementation of the present invention;

FIGS. 14 through 16 conceptually depict a sequence of block-specific corrections implemented for diagonal detected blocks in accordance with an exemplary implementation of the present invention.

DETAILED DESCRIPTION

Figure 1:
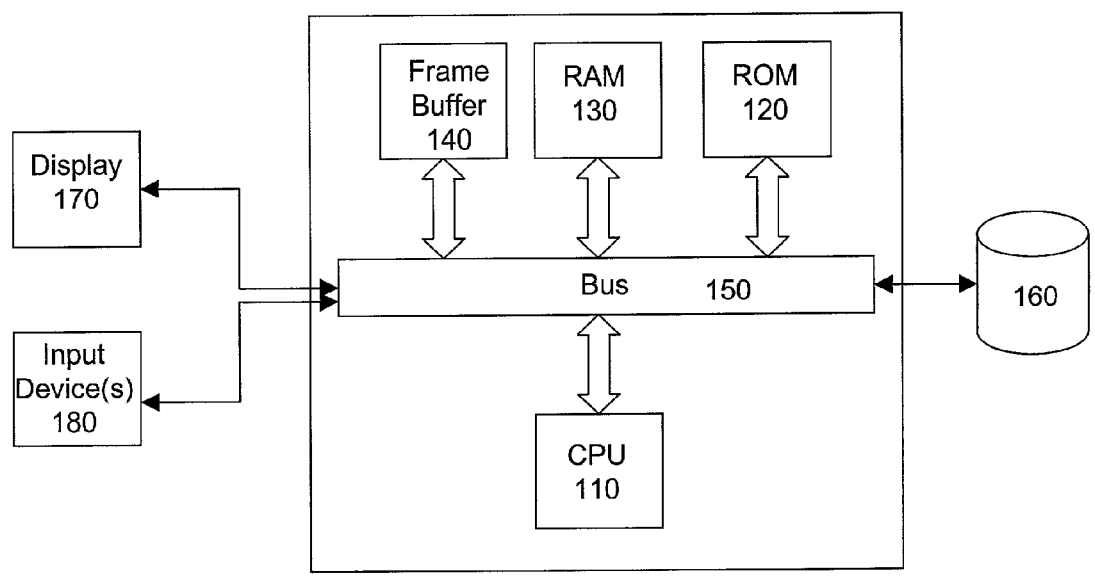
FIG. 1 conceptually depicts an exemplary computer system for enhancing decoded video data in accordance with a preferred implementation of the present invention.

Referring to FIG. 1, an exemplary computer system for enhancing decoded video data in accordance with the present invention preferably includes a bus 150 for communicating information, a central processing unit (CPU) 110, a read only memory (ROM) 120, random access memory (RAM) 130 and a frame buffer 140. Additionally, a mass storage device 160, a display device 170 and an input device 180 may be provided. The storage device may include a hard disk, CD-ROM drive, DVD drive, tape drive, memory and/or other mass storage equipment. The input device may include a communications link and/or other means for inputting data. These elements are typically included in most computer systems and the aforementioned system is intended to represent a broad category of systems supporting decoded video data processing. Of course, the computer system may include fewer, different and/or additional elements, provided it is capable, when programmed, of processing decoded (or decompressed) video data in accordance with the present invention. Additionally, the system may either stand alone or operate in a distributed environment. Furthermore, it is understood by those of skill in the art that the present invention may be implemented using a system comprised of a digital signal processor (DSP), an application-specific integrated circuit (ASIC), discrete gate logic, or other hardware, firmware, or any conventional programmable software module and a microprocessor. The software module could reside in RAM memory, flash memory, registers, or any other form of readable and writable storage medium known in the art.

An image on the display device 170 is made up of individual dots known as pixels (short for picture elements). The frame buffer 140, which can be a designated part of main memory or a separate memory designed for image display, stores data representative of each pixel. The display 170 is usually serially addressed, with pixels being sent to the display one at a time, starting at the top left corner of the screen and scanning along each line sequentially until the bottom right corner is reached. For analog display devices, frame buffer data is typically translated from binary to one or more voltages for each pixel. To allow new image data to be generated while a current image is being scanned to the display, many conventional architectures include two frame buffers. The present invention provides a method of enhancing decoded digital video data while the data is still in a frame buffer without appreciably delaying display rendering.

The amount of time that is tolerable to complete enhancement is preferably no longer than the time between frames. Thus, for NTSC video, the time required can be no longer than approximately ⅓₀th of a second. If processing takes longer, it will begin to appreciably delay display rendering.

The subject invention is not limited to a specific source of compatible video data, a particular mode of operation (i.e., real-time or not real-time) or a particular delivery method. It may be utilized with streaming or stored video data. It may be applied in real-time or in a buffered or archival mode. Furthermore, it may be applied to process streaming video data received via a communications link (e.g., a DSL or cable modem connection), video data that has been downloaded and stored, and video data derived from a local source (e.g., video stored on a DVD).

While the system and methodology of the present invention are preferably applied to video data that has been encoded and decoded in accordance with MPEG standards (e.g., MPEG-2 and MPEG-4), those skilled in the art will appreciate that the present invention is directly applicable to other video encoding-decoding processes that employ the discrete cosine transform (DCT), including possible successors to MPEG-4 and methodologies for video conferencing and video telephony, such as those according to ITU-T standards. Such applications come within the scope of the present invention.

A detection methodology in accordance with the present invention may be applied to video data derived from transform-based video encoding-decoding processes (other than MPEG and ITU-T) that employ detectable patterns or functions (e.g., basis functions) for encoding blocks that are likely to be sources of error. Correction methodologies in accordance with the present invention may be applied without the detection methodology of the present invention; although such an implementation may be less computationally efficient. Such applications also come within the scope of the present invention.

Those skilled in the art will also appreciate that a system and method in accordance with the present invention may be applied to enhance encoded still images, such as JPEG images. In such case, each single image frame is addressed. The images may be obtained from any number of sources, such as Internet web sites. Thus, a system in accordance with the present invention may be integrated with a web browser to enhance the quality of uploaded images without appreciably delaying display rendering.

MPEG encoding removes redundant and less important information from video data prior to transmission. Generally speaking, the redundancies may include spatial and temporal redundancies (e.g., correlation between neighboring pixels, both within the same frame and between adjacent frames), entropy redundancy (e.g., frequent reoccurrence of some values more than others for any non-random digitized signal) and psycho-visual redundancy (e.g., details such as chromatic resolutions, spatial resolutions and temporal resolutions that are generally insignificant to human perception or entirely imperceptible). MPEG decoding then reconstructs an approximation of the original image from the encoded data.

Figure 2:
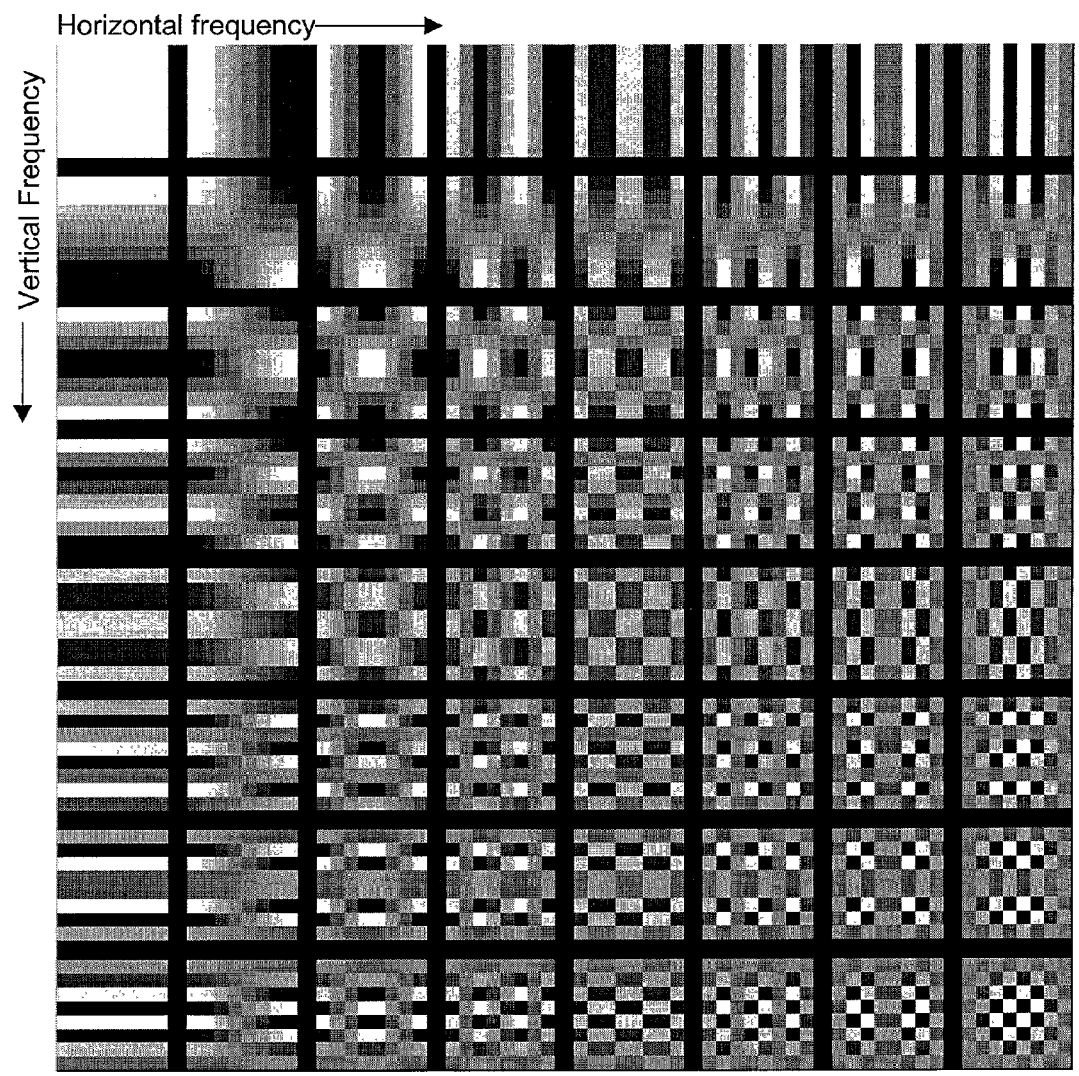
FIG. 2 conceptually depicts basis functions (i.e., fundamental blocks), in the discrete cosine transformation grid, which are detected in accordance with a preferred implementation of the present invention.
Figure 3:
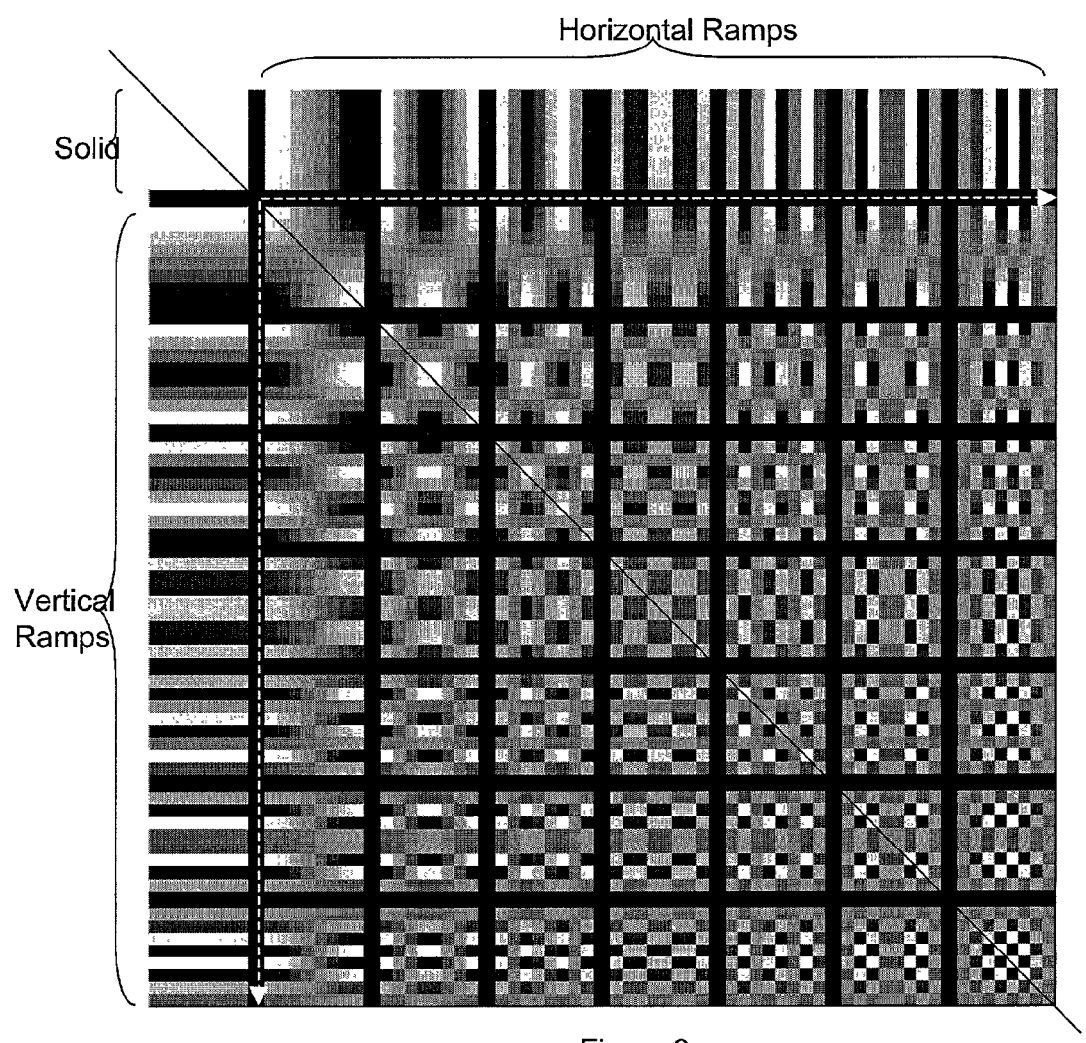
FIG. 3 depicts a table of basis functions in the discrete cosine transformation grid with a diagonal axis to conceptually illustrate its symmetrical properties, which are utilized in accordance with a preferred implementation of the present invention, and naming conventions used herein for certain types of blocks.

The methodology of a preferred implementation of the present invention utilizes decoded data stored in the frame buffer, and attempts to remove errors introduced or propagated during encoding to faithfully yield enhanced video. The decoded data can be conceptually arranged in arrays of pixel. Images may be broken down into macroblocks, which are 16×16 sections of video on the screen. Macroblocks are broken down further to 8×8 sections known as submacroblocks (referred to herein as blocks), each of which represent one or more frequencies, i.e., basis functions, in the discrete cosine transformation grid such as that graphically depicted in FIG. 2. The corresponding basis functions are derived from the well-known DCT equation:

$$F(u, v) = \frac{1}{4} C_u C_v \sum_{x=0}^{7} \sum_{y=0}^{7} f(x, y) \cos\left(\frac{(2x+1)u\pi}{16}\right) \cos\left(\frac{(2y+1)v\pi}{16}\right)$$

where $C_u = \frac{1}{\sqrt{2}}$ for $u = 0$, $C_u = 1$ otherwise $C_y = \frac{1}{\sqrt{2}}$ for $y = 0$, $C_y = 1$ otherwise Significantly, the two dimensional DCT table of basis functions is highly symmetrical along a diagonal axis starting at the top left corner and running to the bottom right corner, as conceptually depicted in FIG. 3. The symmetry is leveraged to facilitate detection in accordance with an exemplary detection methodology, such as the methodology described more fully below.

As also shown in FIG. 3, the top left block is a solid block. The remaining blocks in the top row are referred to herein as ramps or horizontal frequency blocks. The remaining blocks in the first column are referred to herein as ramps or vertical frequency blocks. The remaining blocks in the other rows and columns (as delineated in FIG. 3 by perpendicular dashed lines) are referred to herein as texture blocks.

The present invention recognizes that perceptibility of quantization error greatly varies with the DCT frequency, with singular frequency blocks, i.e., basis functions, being primary suspects for producing artifacts. These blocks typically represent either areas that the encoder identified as less important and allocated the least bandwidth to try to reproduce the video, or simplistic areas of video that do not require more than one frequency representation to produce the video. Thus, during encoding, blocks with less detail may have been accorded a lower priority (e.g., as background items) and therefore transformed only once (or twice) depending on the level of detail to be presented. These blocks, which are identical to or substantially similar to basis function blocks, are prime suspects for errors. In sharp contrast, blocks with more detail may have been given a higher priority (e.g., as foreground objects) and therefore transformed multiple times, consuming greater bandwidth.

Figure 9:
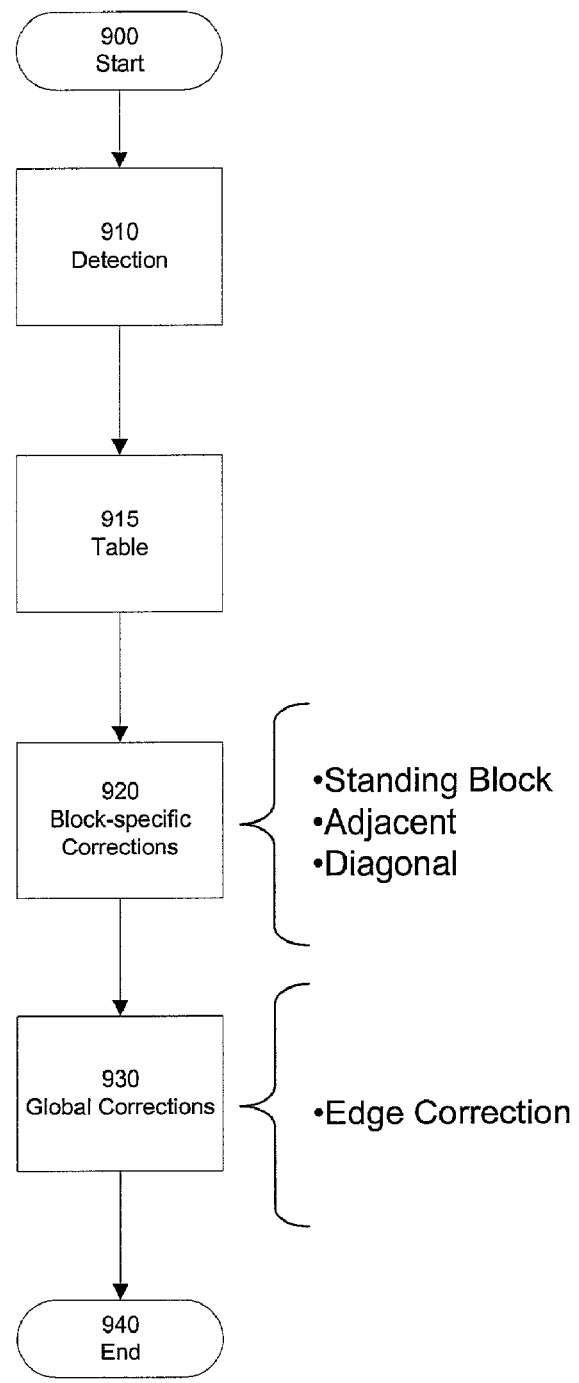
FIG. 9 is a high level flow chart of an exemplary methodology in accordance with a preferred implementation of the present invention.

Accordingly, referring to the high-level flow chart provided as FIG. 9, the methodology of a preferred implementation of the present invention analyzes decoded data in the frame buffer to identify singular frequency DCT blocks, as in step 910. The preferred analysis is efficient, taking into account symmetrical properties of the basis functions and using a relatively small number of computations to determine whether a block qualifies as a singular frequency (i.e., fundamental) DCT block. If a block so qualifies, then it is a target for detection and a candidate for block-specific error correction. By focusing such error correction processes on the detected fundamental blocks, the present invention efficiently allocates computing resources for real-time error correction. These DCT basis function blocks are referred to as singular frequency, coarse frequency, coarse and fundamental blocks.

Color spaces are three-dimensional (3D) coordinate systems in which each color is represented by a single point. Colors appear as their primary components red, green and blue, in the RGB color space. Each color appears as a luminance (or luma) (brightness) component, Y, and two chrominance (or chroma) components, U and V, in the YUV space. The following transformations of RGB to YUV values is well-known in the art:

$Y=0.299 \times R+0.587 \times G+0.114 \times B$ $U=-0.299 \times R-0.587 \times G+0.886 \times B$ $V=0.701 \times R-0.587 \times G-0.114 \times B$ Generally speaking, the eye is more sensitive to luminance represented by Y than chrominance represented by U and V. Thus, luminance, the intensity or brightness perceived, is decoupled from the chrominance components so the intensity can be varied without affecting the color. The YUV format is the defacto standard used for image and video compression.

As the human eye discriminates changes in luminance detail better than changes in color detail, more bits are used to store the luminance information Y than the color differences communicated in the U and V components. Thus, in MPEG encoding, the color differences U and V are typically sub-sampled to reduce their data content. YUV is typically used in a packed pixel format for MPEG encoding. Common formats used with MPEG video include UVYV, YUY2 and others. In each, U and V values are subsampled for each X pixel. For example, in UVYV the pixel format is four 8-bit values, which are stored as YVYU or UYVY. The four values correspond to luminance and chrominance for 2 pixels, with the lower priority chrominance values being shared between both pixels. To calculate the color and brightness for individual pixels adjacent UV values are combined.

While the exemplary systems and methodologies described herein employ YUV values, it is understood that alternative color space values (e.g., RGB) may be employed, without departing from the scope of the present invention. For example, instead of averaging two YUV values, two RGB values may be averaged.

Blocks are encoded without regard to the neighboring block's color, so two hues or brightness values can be created with a simple DCT value and result in a "blocking" effect. Since the data produces a square display, the eye easily discerns different colored adjacent blocks.

An objective of the detection methodology of the present invention is to efficiently determine whether a block qualifies as a block that is a likely source of error (e.g., a fundamental block). To accomplish this objective, a preferred methodology employs a determined number of pixel locations within each 8×8 block and rules derived from the symmetrical properties of the DCT basis functions. The detection methodology preferably detects fundamental blocks, or gives up, within a defined maximum number of steps (e.g., 10) per block. A large number of steps in a detection methodology may render it unsuitable for real-time application.

Figure 4:
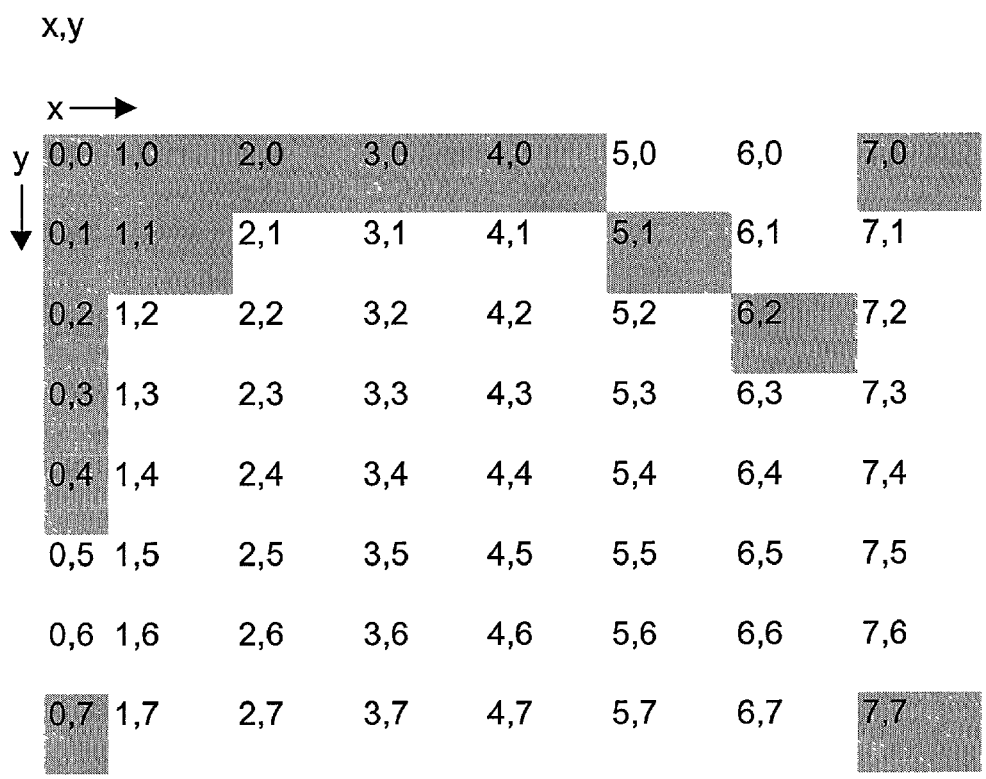
FIG. 4 conceptually depicts pixels in an 8×8 block, with the highlighted pixels used in a detection methodology in accordance with a preferred implementation of the present invention.

In a preferred implementation, binary luminance values are used for the detection methodology. However, chrominance values may be used in addition to (or in lieu) of the luminance values. A preferred detection methodology entails a process of elimination using determined pixel locations within each 8×8 block, such as the 15 possible pixel locations shown as shaded regions in FIG. 4. Comparisons of chosen pixel values according to determined rules reveal if a block is a fundamental block. Those skilled in the art will appreciate that other pixel locations and a different number of pixel locations may be used in the detection methodology, provided that application of the corresponding rules enables detection of fundamental blocks. Such other pixel locations and numbers of pixels come within the scope of the present invention.

An exemplary detection methodology is conceptually illustrated in the flowcharts provided as FIGS. 5 through 8, and as step 910 in the high-level flowchart provided as FIG. 9. Other detection processes, which logically determine whether blocks correspond to fundamental DCT blocks, will also work, and come within the scope of the present invention. For instance, alternative processes of elimination can readily be devised in accordance with the disclosed detection process.

Figure 5:
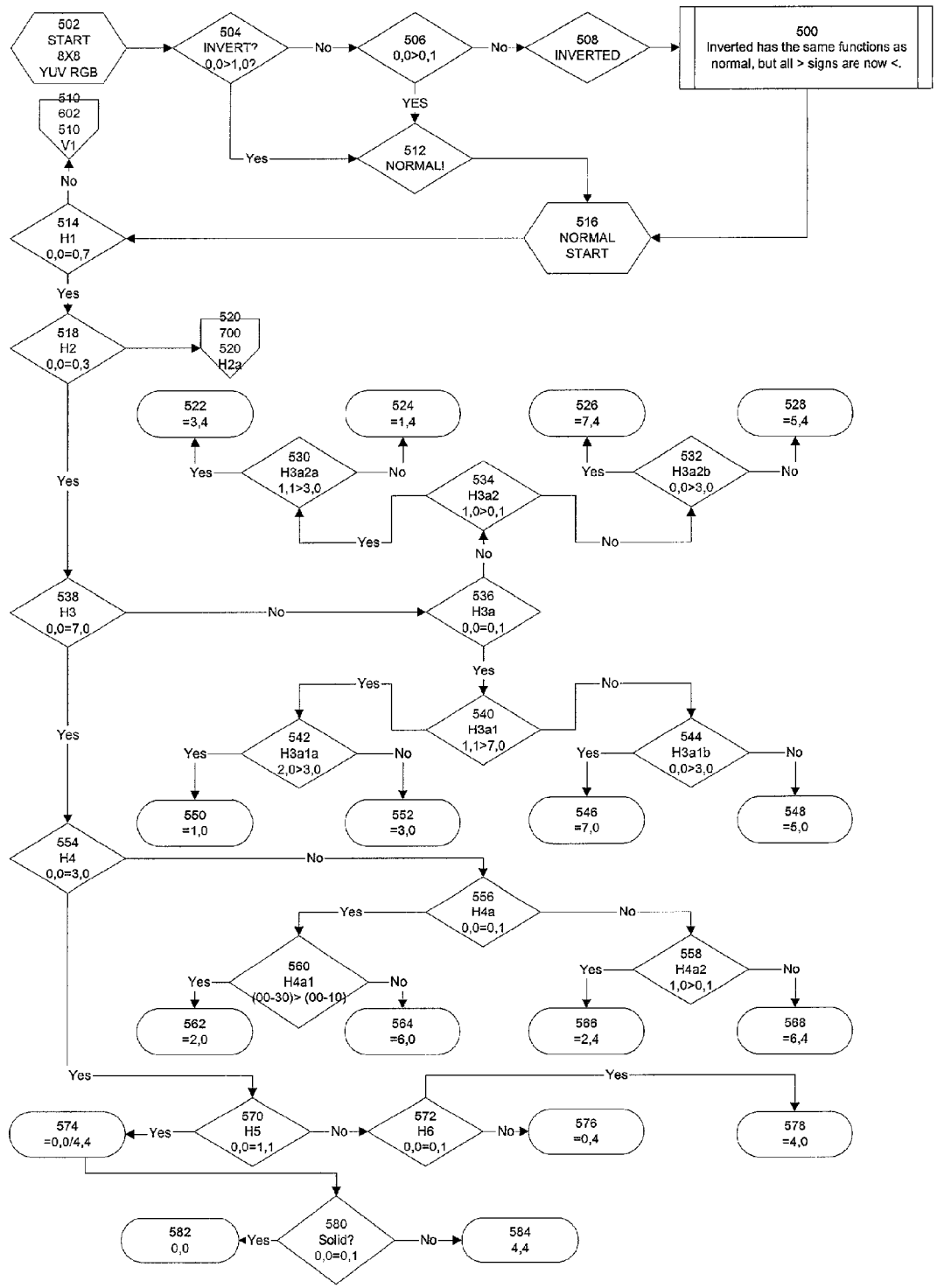
FIGS. 5 through 8 are flowcharts conceptually illustrating an exemplary detection methodology in accordance with a preferred implementation of the present invention.
Figure 6:
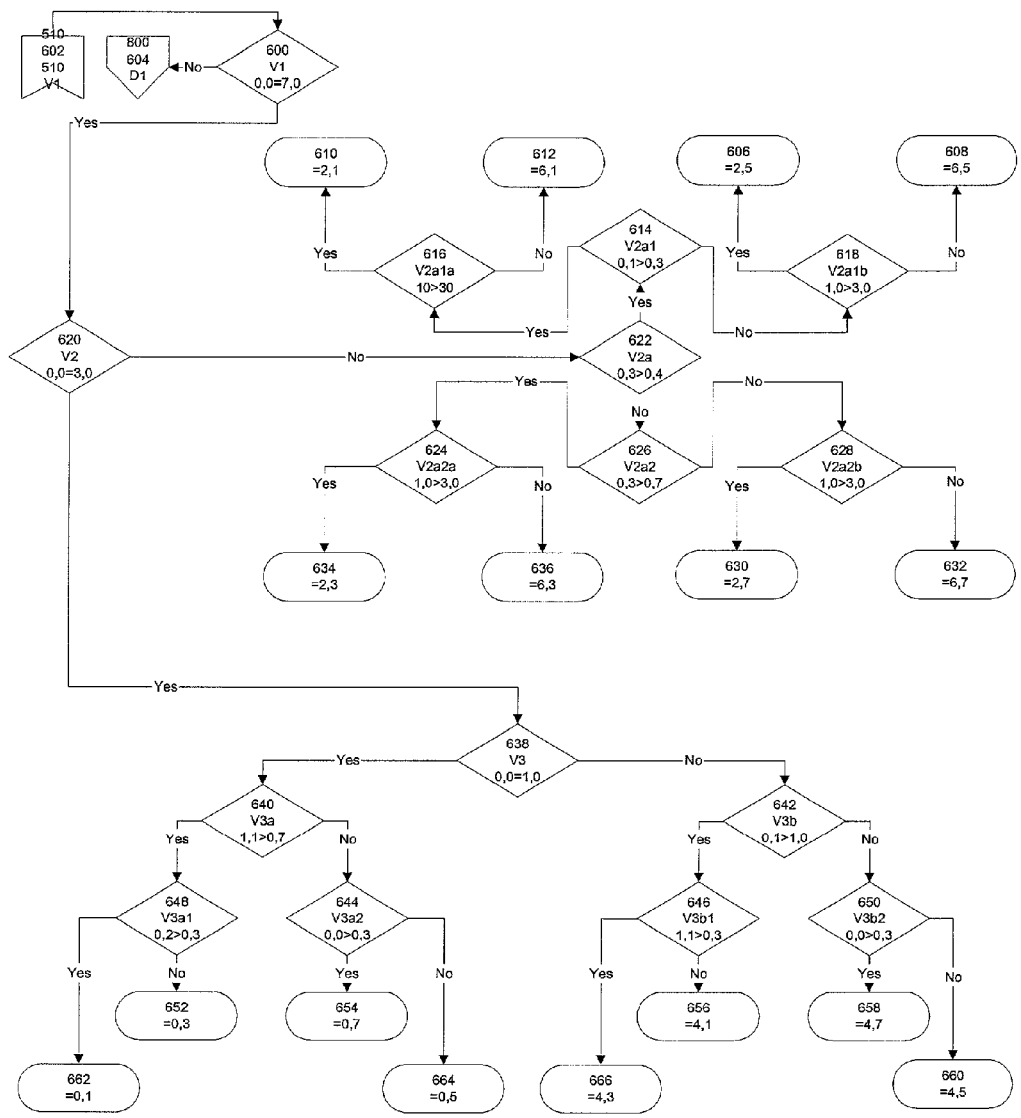
Figure 7:
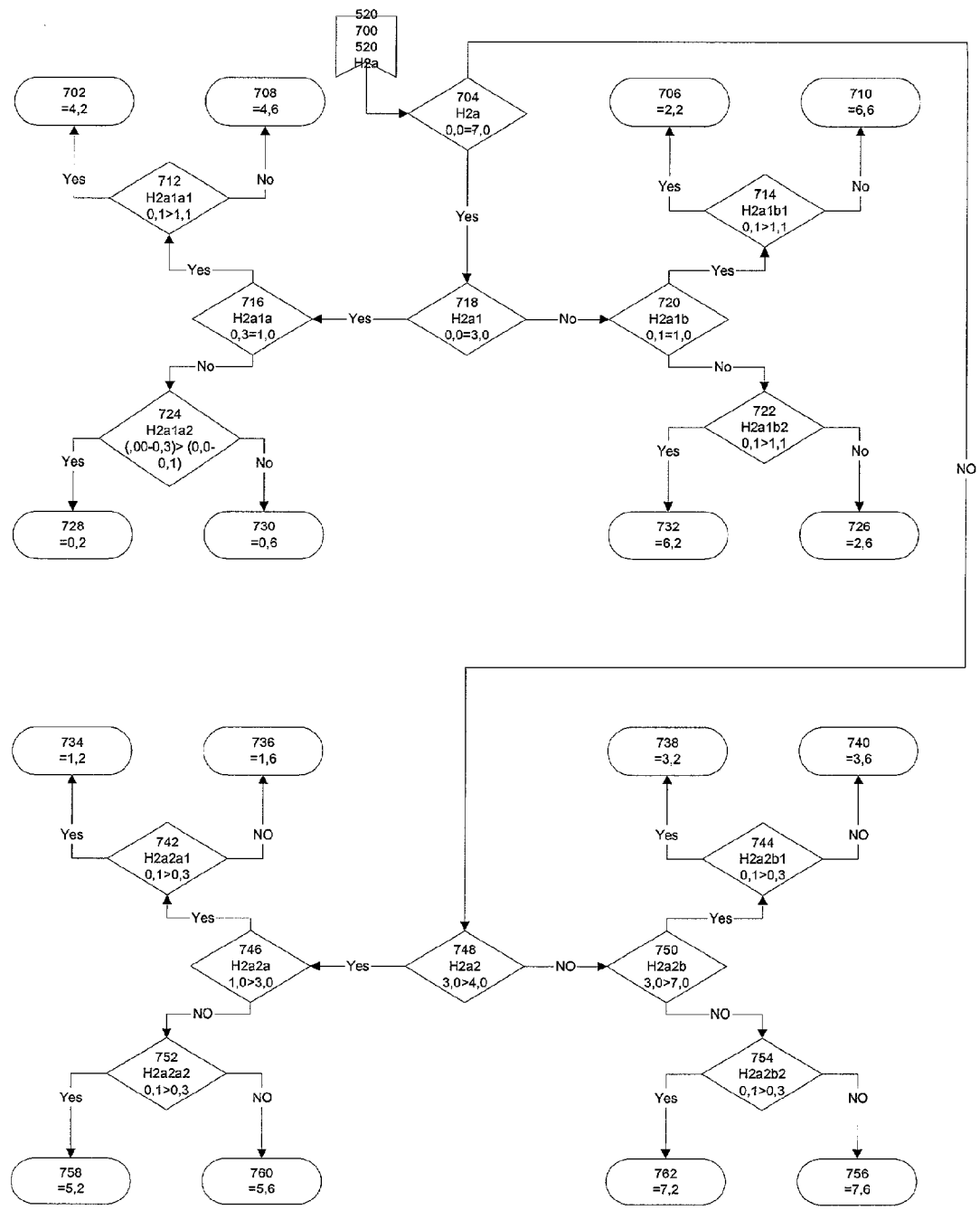
Figure 8:
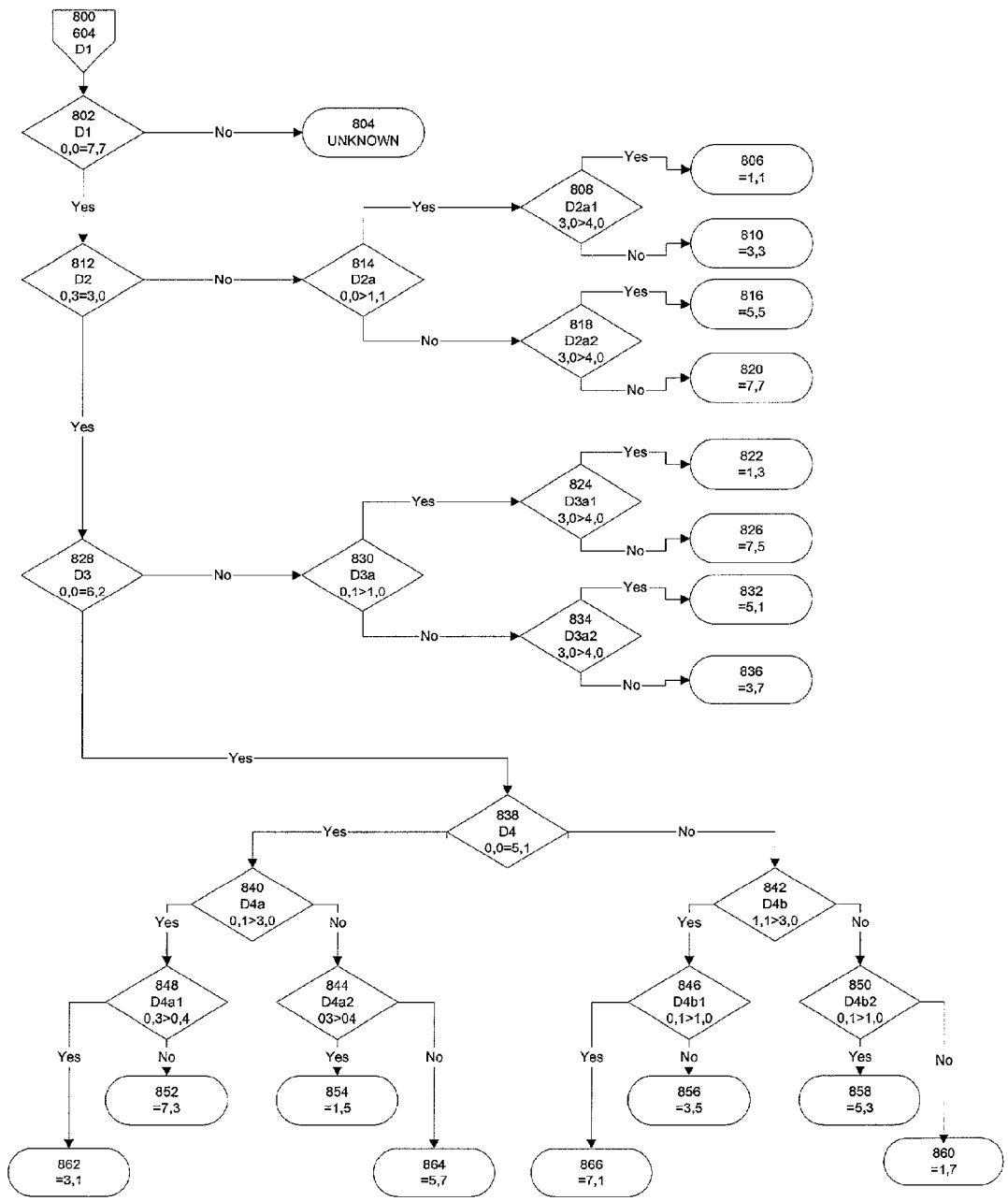

Referring to the flow chart in FIG. 5, the detection methodology begins with steps for checking for inverted luminance. Absent an inversion, (0,0) should always be greater or equal to its immediately adjacent pixels horizontally or vertically. In step 504, the (0,0) value is compared with the (1,0) value. If (0,0) is not greater than (1,0), then (0,0) is compared with (0,1), as in step 506. If (0,0)<(0,1) then the block is deemed to have an inverted luminance value. If either of the logical checks in steps 504 and 506 is true, then the block is deemed to be normal and logic moves to the H1 check, steps 512–516. In the event of inversion, the detection methodology proceeds accordingly, but all greater than signs > and less than signs < are switched as in step 500. Otherwise, the inversion would lead to spurious results.

Next, the methodology determines if the block is a vertical or a horizontal fundamental block (VFB and HFB herein, respectively). First (0,0) is compared with (0,7), as in step 514. If these values are equal then the block is a possible HFB. If not, it is a VFB, or a diagonally combined block (DCB herein) and control passes to step 602 in FIG. 6, and detection processing proceeds.

Assuming that the block is an HFB. The possibilities are then limited to all even vertical axis blocks, because no odd blocks have (0,0)=(0,7). These possibilities include (0,0), (1,0), (2,0), (3,0), (4,0), (5,0), (6,0), (7,0), (0,2), (1,2), (2,2), (3,2), (4,2), (5,2), (6,2), (7,2), (0,4), (1,4), (2,4), (3,4), (4,4), (5,4), (6,4), (7,4), (0,6), (1,6), (2,6), (3,6), (4,6), (5,6), (6,6), (7,6)—32 of 64 possible blocks. Thus, this step reduces the number of possible fundamental blocks by 50%.

Next, (0,0) is compared with (0,3), as in step 514. If these values are equal then the block is either an (x,0) or an (x,4) block. These possibilities include (0,0), (1,0), (2,0), (3,0), (4,0), (5,0), (6,0), (7,0), (0,4), (1,4), (2,4), (3,4), (4,4), (5,4), (6,4), (7,4)—16 of 64 possible blocks, eliminating 50% of the possible blocks from the previous step. If these values are not equal, then the block is either an (x,2) or (x,6) block. These possibilities include (0,2), (1,2), (2,2), (3,2), (4,2), (5,2), (6,2), (7,2), (0,6), (1,6), (2,6), (3,6), (4,6), (5,6), (6,6), (7,6)—16 of 64 possible blocks.

Assuming that (0,0)=(0,3), then (0,0) is compared with (7,0) as in step 538. If these values are equal, then the possibilities are blocks in the first and fifth rows [(0,y) and (4,y)] having even (0, 2, 4 or 6) y values. These possibilities include: (0,0), (2,0), (4,0), (6,0), (0,4), (2,4), (4,4), (6,4)—8 of 64 possible blocks.

Next, assuming that (0,0)=(7,0), values are checked against the $3^{rd}$ horizontal sample. Thus, (0,0) is compared with (3,0) as in step 554. If these values are equal, then the possibilities are further narrowed to the following 4 of 64 possible blocks: (0,0), (4,0), (0,4), (4,4).

Next, assuming that (0,0)=(7,0), a diagonally adjacent block from 0,0 is checked. Thus, (0,0) is compared with (1,1) as in step 570. If these values are equal, then the possibilities are further narrowed to the following 2 of 64 possible blocks: (0,0), (4,4) as in step 576 The remaining values are either symmetrical on both axes or they are not.

Next, assuming that (0,0)=(1,1), a top sample (0,0) and its horizontal or vertically adjacent sample (0,1) or (1,0) are compared. If they are equal, the block is a solid block (0,0); and if they are not equal the block is the symmetrical non solid block (4,4).

Those skilled in the art will appreciate that the foregoing detection methodology has many permutations, and may be varied to achieve the same objective, i.e., comparing values to eliminate blocks from the possible 64 DCT fundamental blocks. Preferably, as in the foregoing example, each comparison eliminates a percentage of the remaining possibilities until only one possibility is left. The foregoing example reduces the possibilities in half with each comparison step after the inversion check, thus going from 64 to 32 to 16 to 8 to 4 to 2 possibilities and then to one possibility, requiring a total of six comparisons ($6^2$=64).

Those skilled in the art will also appreciate that the foregoing detection methodology has many possible variations. Different pixel values may be compared, and the comparisons may be performed in a different order, but still achieve the same objective, i.e., determine if the block is a fundamental block, and, if so, determine which fundamental block. Those variations clearly come within the scope of the present invention.

The foregoing detection methodology is applied to each block in each video frame, identifying those blocks that are fundamental DCT blocks. Instead of creating a complete reference frame, information pertaining to such blocks is stored for efficient reference purposes, such as in a table, step 915 in FIG. 9. Preferably, the information includes a high value for the block, a low value for the block, the frequency and DCT coefficient, as well as one or more additional items, such as a flag and auxiliary bit. All blocks that are not fundamental blocks are identified using a default identifier. The table thus reveals each fundamental block, and provides sufficient information to reveal the block's position and to reconstruct the block. This information is used to determine whether a block-specific correction is warranted, and, if so, then the type of correction that is warranted.

Referring now to the high-level flowchart provided in FIG. 9, upon completing a table, as in step 915, block-specific correction methodologies are preferably applied, as in step 920. The block-specific corrections are intended to reduce certain propagated errors and errors introduced by quantization during the encoding process. Error correction methodologies known in the art may be utilized without departing from the scope of the present invention. In addition to such methodologies known in the art, or instead of such methodologies, error correction processes described herein may be employed. These error correction processes include standing block corrections, adjacent block corrections and diagonal block corrections. The objective is to reduce the errors to which the detected blocks are particularly conducive.

An important aspect of a preferred implementation of the present invention is computing efficiency. Binary arithmetic is used, large processor-specific register sets are utilized, and floating point arithmetic is avoided. The preferred methodology of the present invention leverages such computing techniques to enhance performance, facilitate real-time implementation and reduce cost.

Binary shifts and adds, are favored over subtractions because subtractions involve additional steps. Subtraction is achieved by 2's complement addition. To obtain the 2's complement of a number, first every logic 1 bit in the number is changed to a 0, and every logic 0 bit is changed to a 1. Then 1 is added. Thus the 2's complement of 25 (i.e., 00011001) is 231 (11100111)with the most significant bit representing the sign (1 for negative). Thus, binary 37 minus 25 equals 00100101+11100111, which equals 100001100. However, the 9th bit is a carry bit which is ignored, making the result 00001100 (12).

Concomitantly, a preferred implementation of the present invention favors manipulation of registers over memory transfers from the system and even on-board cache. This reduces time consuming reads in and out of the CPU.

A preferred implementation of the present invention also favors binary divisions by two. To perform binary divisions by two, values are first converted from 8-bit values to 16-bit for precision. The division is accomplished with a shift right by 1 bit. Thus, to determine the average of two values, each value is first converted from 8 to 16 bit through unpacking or bit manipulation. Then the values are added. The division is accomplished by a shift right 1 bit in the result. Then the result is packed back up or otherwise manipulated to 8-bit.

For example, the average of 50 (00110010) and 100 (01100100) is preferably accomplished by converting the values to 16-bit (0000000000110010 and 0000000001100100, respectively), adding them to get the sum 0000000010010110, and shifting the sum by 1 bit to the right to yield 0000000001001011, and then restoring the result to 8-bit (01001011). Thus, the average of 50 (00110010) and 100 (01100100) is 75 (01001011).

Additionally, a preferred implementation of the present invention leverages large register sets, such as the Intel® MMX register set which includes eight 64-bit registers. By using larger registers, more pixels can be processed per instruction cycle. This leads to more efficient use of available computing resources and, consequently, lower cost.

Adjacent fundamental blocks having a difference in luminosity and/or color (e.g., a difference between averages for blocks) that falls within a determined range are corrected according to the adjacent block correction methodology. The range is based upon perception and computational efficiency. Preferably, only those adjacent blocks having perceptible luminance (and/or chrominance) differences (e.g., 4), but not more than a maximum (e.g., 32), are corrected. Differences greater than the maximum are considered so starkly dissimilar that the differential was probably intended when the video was originally generated.

Significantly, block-specific corrections apply only once to an edge (i.e., an edge adjacent to an edge of a fundamental block). If a block edge has been previously modified then the correction methodology skips that edge and goes to the next edge, to prevent additional calculations which can result in distortion.

The adjacent block correction method entails blending or smoothing to create a gradual transition from one DCT frequency to the other. Weighted averages are computed for pixels in a determined number of columns on each side of the shared edge for both blocks. In a preferred implementation, the number of columns is 4, though other amounts (e.g., 3 columns) may be utilized without departing from the scope of the present invention.

Referring now to FIG. 10, adjacent left (L) and right (R) blocks are shown. The blocks share an edge along L(7,0) to L(7,7) and R(0,0) to R(0,7). For exemplary purposes, assume the values in the left block (L) are 50 and the values in the right block (R) are 100. FIG. 11 provides a graphical representation of steps of the correction methodology for the first row. The values in columns L7 and R0 are replaced with averages, as in step 1110. Thus, L(7,0) and R(0,0) are replaced with their average 75, A1. The average A1 equals the sum of L(7,0) and R(0,0) divided by two, with the division being performed by a bit shift right as discussed above.

Next, the third pixel away from the edge is replaced with its average with A1. Thus L(5,0) is replaced with (L(5,0)+A1)/2, as in step 1120. While the average of L(5,0), i.e., 50 (00110010 in binary), and A1, i.e., 75 (01001011 in binary), equals 62.5, the result of the computation (A3L) is actually 62 (00111110 in binary) because all amounts less than one are truncated. Likewise, R(2,0) is replaced with (R(2,0)+A1)/2. In binary, the result is 01010111 (i.e., 87), referred to herein as A3R.

Next, the second pixel away from the edge is replaced with the average of the averages computed above. Thus L(6,0) is replaced with (A1+A3L)/2, i.e. 01000100 (68), A2L, as in step 1130. Likewise, R(1,0) is replaced with (A1+A3R)/2, i.e., 01010001 (81), A2R.

Next, the fourth pixel away from the edge is replaced with the average of the itself and the value in the pixel adjacent pixel which is closest to the shared edge. Thus L(3,0) is replaced with (L(4,0)+A3L)/2, i.e. 00111000 (56), A4L, as in step 1140. Likewise, R(3,0) is replaced with (R(3,0)+ A3R)/2, i.e., 01011101 (93), A4R.

The foregoing process of computing weighted averages repeats for each row of the blocks, creating a smooth transition between the left block and the right block. Though the blocks are shown horizontally side-by-side in FIG. 10, they may be arranged vertically, one on top of the other. In such case, the process would still proceed along the shared edge.

Additionally, a block may adjacent to more than one fundamental DCT block. For example, a fundamental block may be positioned vertically above another fundamental block, which may be positioned horizontally adjacent to yet another fundamental block. In each case, processing proceeds along the shared edges, except that pixels that have been previously modified are not modified again.

The adjacent block correction methodology described above also applies to correcting solid to solid, ramp or texture blocks. Thus, for example, the right block could be a ramp or texture block.

Those skilled in the art will appreciate that the foregoing process of blending to create a smooth transition may be performed using various different formulae and methods without departing from the scope of the present invention. For example, to adjust the four pixels in the analyzed row of each block in accordance with the foregoing example, first, L(7,0) and R(0,0) may be replaced with their average 75. Then the remaining three pixels L(6,0) to L(4,0) in the left block and the remaining three pixels R(1,0) to R(3,0) in the right block can be adjusted to provide a gradual transition from 75 to 50 and from 75 to 100 in a number of ways, including linearly. To avoid floating point computation, the decrement and increment may be determined by two successive divisions by 2 of the transitional difference (25). Thus, using the binary division by a shift 1-bit to the right as describe above, 25 (00011001) divided by 2 equals 12 (00001100); and 12 (00001100) divided by 2 equals 6 (00000011). Accordingly, L(6,0), L(5,0) and (L4,0) may be adjusted linearly by equal decrements of 6 to 69, 63 and 57, respectively. Likewise, R(1,0), R(2,0) and R(3,0) may be adjusted linearly by equal increments of 6 to 81, 87 and 93, respectively.

Figure 12:
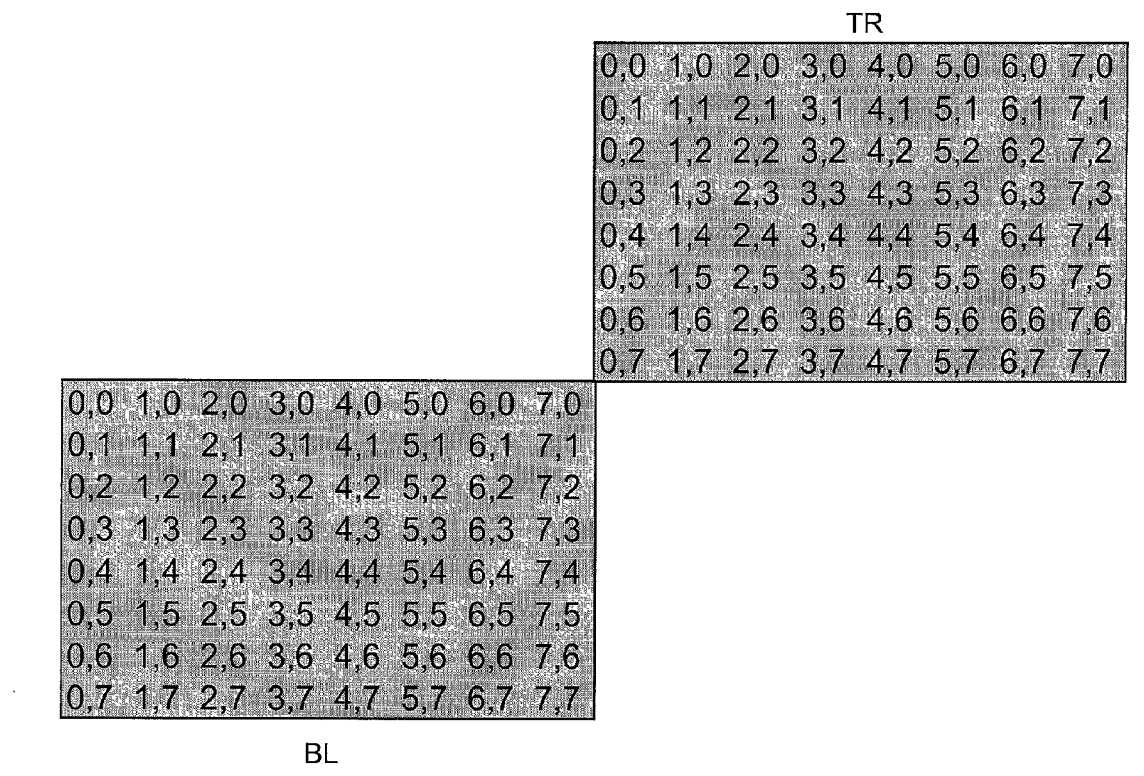

A diagonal block correction entails blending or smoothing to approximate a diagonal line. As there are no diagonal DCT basis frequencies, DCT-based transforms commonly employ diagonal coarse frequency blocks. For example, to represent a diagonal line, the top right block TR and the bottom left block BL, in FIG. 12, may be solid blocks. To reduce the appearance of unintended jagged edges, the diagonal block correction methodology provides a weighted adjustment of neighboring pixel regions (each a "correction region"), preferably such as the generally triangular shaded regions in blocks TL and BR, as conceptually shown in FIG. 13.

Before applying a diagonal correction, the diagonal blocks, e.g., TR and BL, should be analyzed to determine whether they fall within an acceptable range. Fundamental blocks having a difference in luminosity and/or color that falls within a determined range are corrected according to the diagonal block correction methodology. Again, the range is based upon perception and computational efficiency. Preferably, only those diagonal blocks having perceptible luminance (and/or chrominance) differences (e.g., 4), but not more than a maximum (e.g., 32), are corrected. Differences greater than the maximum are considered so starkly dissimilar that the differential is probably intended. Conversely, differences less than a minimum threshold are considered to be imperceptible to the human vision system.

Figure 13:
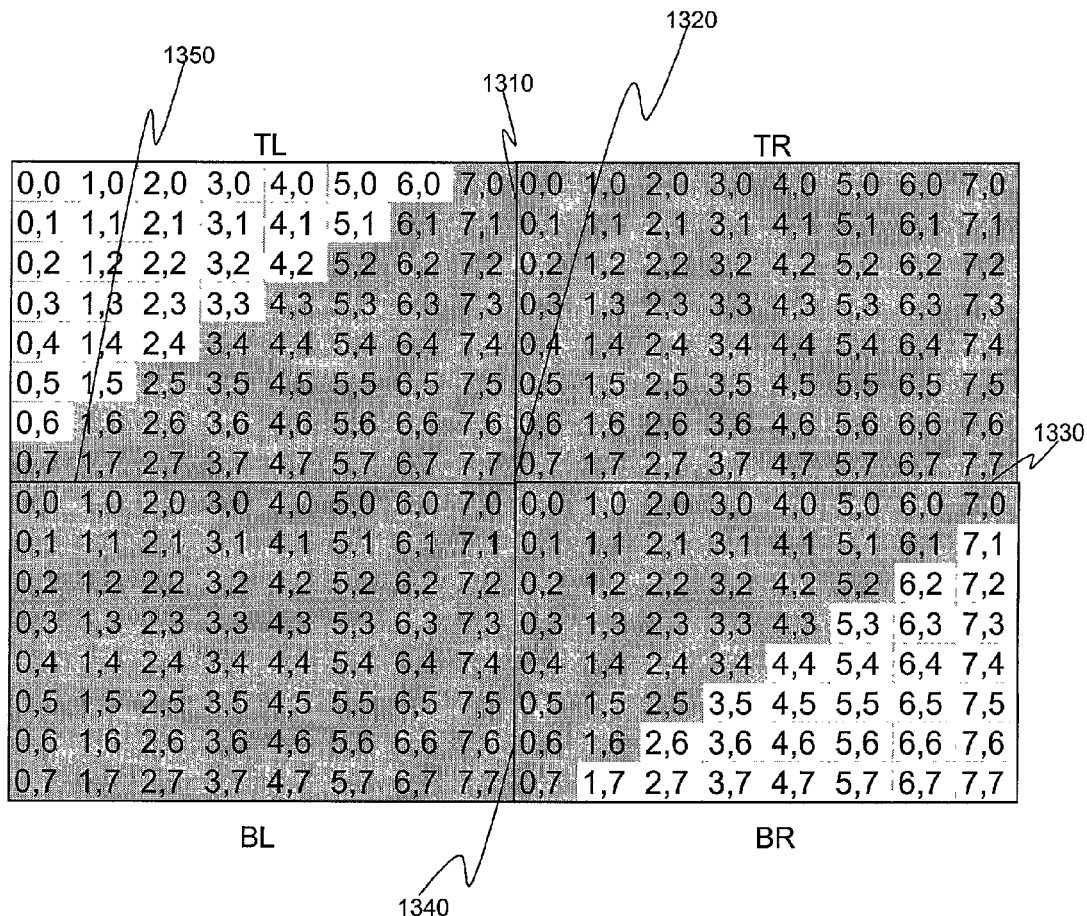
FIG. 13 conceptually depicts four blocks including two diagonal detected fundamental blocks for purposes of illustrating a block-specific corrections implemented for the diagonal detected blocks in accordance with an exemplary implementation of the present invention.

The correction region is preferably defined by the edges of blocks BR and TL (each a "correction block") that are shared with the diagonal fundamental blocks BL and TR (each a "shared edge") and a diagonal line passing through the non-intersecting corners of the shared edges for each block being corrected (i.e., BR and TR). Referring to FIG. 13, the shared edges include 1310 and 1350 for TL, and 1330 and 1340 for BR. The diagonal lines run from 0,7 to 7,0 for BR, and from 0,7 to 7,0 for TL. Pixels on the diagonal line are preferably included in the region; although they may be excluded without substantially compromising the correction.

A preferred starting pixel for correction processing is a pixel in the correction region that is immediately adjacent to the intersection of the shared edges for the correction block. The starting pixel for BR in FIG. 13 is 0,0, and for TL is 7,7. The correction process moves from the starting pixel along a row or column parallel to either shared edge. As the correction process moves along the row or column, each pixel in the correction region is addressed (and possibly adjusted) up to the last pixel that is in the row or column being addressed, within the correction region and adjacent to the opposite end of the shared edge. Upon reaching the last pixel, correction processing resumes with the next parallel row or column in the correction region, starting at the pixel that is adjacent to the starting pixel for the previous row or column. Correction processing continues until each pixel in the correction region has been addressed (and possibly adjusted).

Thus, for BR, correction processing may proceed from 0,0 to 7,0; 0,1 to 6,1; 0,2 to 5,2; 0,3 to 4,3; 0,4 to 3,4; 0,5 to 2,5; 0,6 to 1,6; and 0,7. Alternatively, correction processing for BR may proceed as follows: from 0,0 to 0,7; 1,0 to 1,6; 2,0 to 2,5; 3,0 to 3,4; 4,0 to 4,3; 5,0 to 5,2; 6,0 to 6,1; and 7,0. Either way is acceptable.

Likewise, for TL, correction processing may proceed from 7,7 to 7,0; 6,7 to 6,1; 5,7 to 5,2; 4,7 to 4,3; 3,7 to 3,4; 2,7 to 2,5; 1,7 to 1,6; and 0,7. Alternatively, correction processing for TL may proceed as follows: from 7,7 to 0,7; 7,6 to 1,6; 7,5 to 2,5; 7,4 to 3,4; 7,3 to 4,3; 7,2 to 5,2; 7,1 to 6,1;and 7,0.

Correction processing for each pixel in a correction region preferably entails adjusting to provide a smooth transition between blocks BL and TR and a more precisely defined diagonal. While various averaging, combing or blending techniques may be employed, in a preferred implementation each pixel in the correction region is replaced with the average of the current pixel values for the immediately adjacent pixels closest to the shared edges. Thus, in FIG. 13, each pixel in the correction region will be replaced with the average of the current pixel values for the pixels immediately above and to the left of the pixel being addressed. Thus, 0,0 is replaced with the average of 0,7 and 7,0. Next, 1,0 is replaced with the average of 1,7 and the current value of 0,0.

Figure 14:
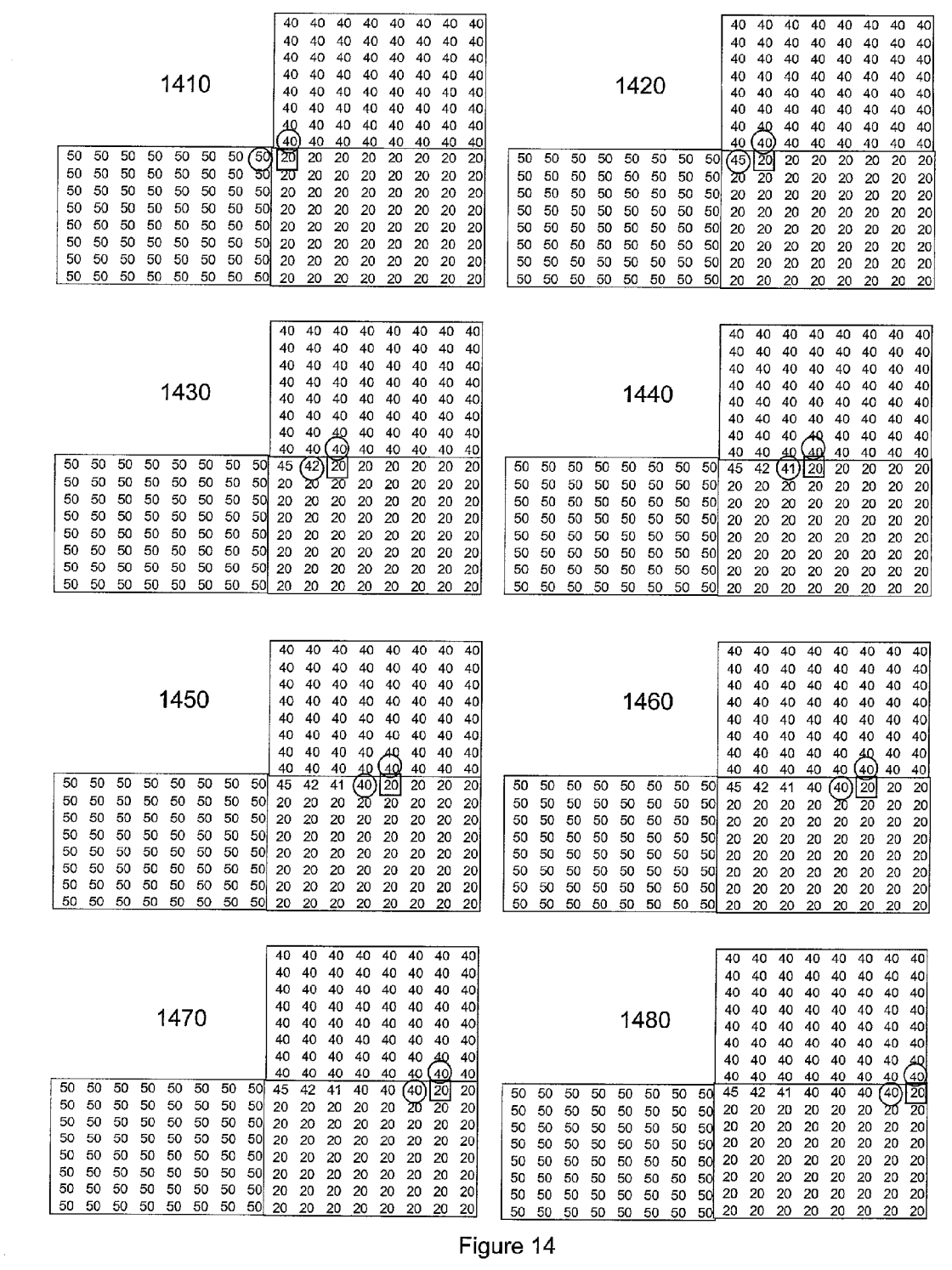
Figure 15:
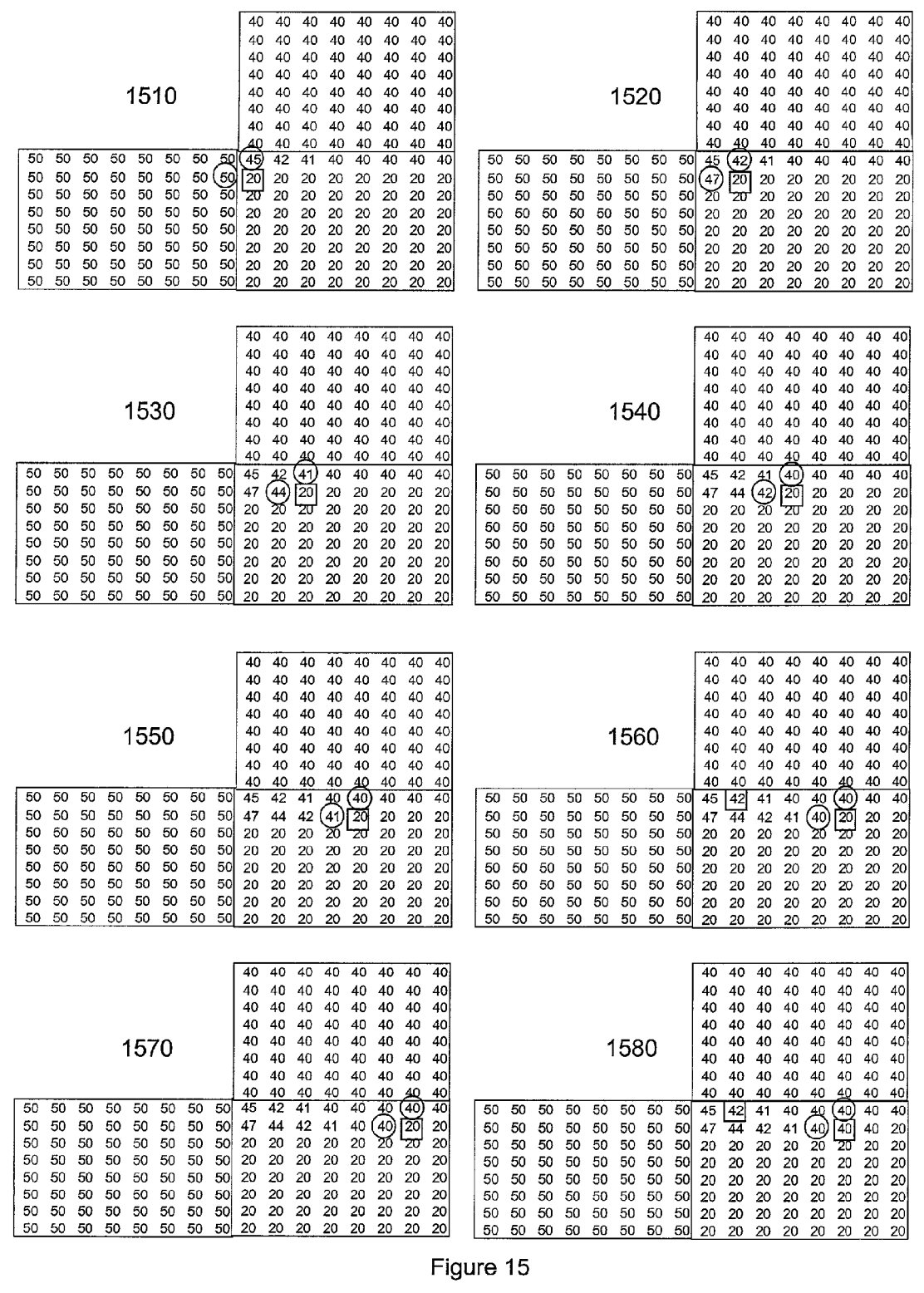

Referring now to FIGS. 14 and 15, exemplary correction processing is conceptually illustrated for the first two rows of the correction region for block BR. In each step, 1410 through 1580, the boxed value is replaced with the average of the two circled values. Thus, in step 1410, the value of 0,0 is replaced with the average of 40 and 50, i.e., 45. The replacement value becomes the current value for that pixel and is reflected in all subsequent steps, i.e., steps 1410 through 1580. All averaging is preferably accomplished using a binary arithmetic process, such as the shift right process discussed above. In such case, all fractions are lost due to truncation. Thus, the average of 41 and 40 is expressed as 40.

To further illustrate, in step 1420, pixel 1,0 is replaced with the average of the then current value for pixel 0,0 (i.e., 45) and 40. This process continues for each pixel in the correction region.

FIG. 16 conceptually displays block BR upon completion of such processing. The correction methodology achieves a gradual transition between blocks BL and TR. It also adds greater definition to the diagonal intended through those blocks.

Another correction methodology applied in an exemplary implementation of a preferred embodiment of the present invention is known as standing block correction. The flow of photons used to generate video images of physical subjects naturally fluctuates. While many such fluctuations are imperceptible to the human visual system, they may be captured by conventional video and photography equipment, leading to variations in luminance and chrominance values over time. When encoded and accentuated in an 8×8 block, such variations are often perceptible. Standing block correction removes or smoothes such fluctuations.

Solid DCT fundamental blocks are identified as such in accordance with the detection methodology described above. Information pertaining to such blocks is stored for efficient reference purposes, such as in a table, step 915 in FIG. 9. Preferably, the information includes current luminance and chrominance values, as well as a flag for the first occurrence of the values in that block. A flagged solid DCT fundamental block is known as a first time standing anchor.

Upon detecting a DCT fundamental solid block at the same location in the next frame, an exemplary standing block correction methodology first determines whether the difference between the first time standing anchor and the current block falls within a determined range. The range preferably represents a perceptible change in luminance and/or chrominance values, but not so stark as to be an intended variation. The range may be, for example, from 4 to 32 for luminance and/or chrominance values. If the difference falls within the range, the current block is flagged as a standing block, and a standing block correction is applied to it. The correction may entail replacing the current values with values for the first time standing anchor. Aternatively, the standing block and first time standing anchor values may be blended, such as by averaging. In such case, the standing block values may be replaced with averages. Each successive standing block is then compared with each previous standing block. Standing block corrections are applied, until the differences fall outside the determined range. After the values are changed in a standing block, it is processed as a normal solid block in relation to the other blocks surrounding it.

Various error correction or filtering techniques may be applied globally to the detected fundamental and remaining blocks to enhance the displayed image, as step 930 in FIG. 9. Preferably, the global corrections do not alter pixels that have already been modified according to a block-specific correction. Color values (in YUV color space) of a block are compared against corresponding block color value arrays in subsequent video images. Should change in values or frequency exceed a threshold value or range of values, comparison is conducted against adjacent blocks arrays. Such comparison verifies if similar degrees of change are performed in adjacent blocks that would represent motion, rather than error. Should the change in values or frequency be unique as compared to adjacent block array representations, the difference in color values of the target block array as compared against corresponding previous block color values is calculated. Based on the comparison results, the minimum and maximum color values, as well as the DCT frequency, are adjusted accordingly to correct the block.

Another filtering method involves edge correction. First, a block "edge" is identified for filter processing. For example, an "edge" may include either a bottom horizontal row of 8 pixels on the border of a block or a right vertical column of 8 pixels on the border of a block. While an "edge" is depicted as either a bottom horizontal row or right vertical column, it is generally applicable to any linearly aligned consecutive pixels within a block.

Fields a and b preferably denote horizontal rows or vertical columns of adjacent block edges. Ideally, each nth pixel in an "edge" is denoted in either field a or b, and individually includes YUV values to create a plurality of colors.

A copy of the video image frame is held for reference. Once a copy of the image is created, a threshold value is established. Ideally, the threshold value is determined as a measure of human perception of various shades of color. In general, a human being is capable of perceiving 13 gradients of shading in a single YUV color hue.

Once a threshold value is established, a section of a block of pixels is identified for filtering. In an embodiment of the present invention, pixels in an "edge" are selected for filtering. Once a section is identified and selected, every YUV value per selected pixel is processed by the filtering method. Should the YUV value for the processed pixels all be identical, the filtering process may initiate noise correction. However, should the YUV values for the processed pixels vary amongst selected pixels, the filtering system may enable edge correction. At the completion of either edge correction or noise correction, the pixels in the "edge" are preferably evaluated against corresponding pixels in the following video image frame to conduct temporal correction.

A process for filtering noise distortions includes applying statistical computations to the selected pixels to perform immediate noise correction. Such statistical computation is performed recursively until every pixel in an "edge" has been corrected. Preferable recursive statistical computations to calculate corrected YUV vector values for a given pixel 'n' in a selected "edge" field a or "edge" field b include:

(1) the sum of the YUV vector values in the nth pixel in field a and double the YUV vector values in corresponding nth pixel in field b; and
(2) the multiplication of the calculated sums for each individual YUV vector value by one-third.

An exemplary recursive statistical application for calculating an adjusted pixel to correct noise distortion includes calculating corrected individual YUV values for a given pixel in field a. Such calculation preferably entails taking the sum of individual YUV values for the nth pixel in field a plus double a corresponding nth pixel's YUV values in field b. Weighted corrected measures of individual YUV values are preferably determined by multiplying the calculated sum values for individual YUV by one-third (⅓). Such computation captures pixel YUV values in field b to be contributed to the correction of the given nth pixel in field a.

Further correction of noise distortion may be enabled by calculating corrected individual YUV values for a given corresponding pixel in field b. Such calculation preferably entails taking the sum of individual YUV values for an nth pixel in field b plus double a corresponding nth pixel's YUV values in field a. Such calculation preferably references an original image frame, as copied, to ensure accurate noise correction. The weighted corrected measures of individual YUV values for a pixel in field b are preferably determined by multiplying the calculated sum values for individual YUV by one-third (⅓). Such computation captures YUV values for the nth pixel in field a to be contributed to the correction of the given nth pixel in field b.

The resulting weighted corrected measures of individual YUV values for corresponding pixels in fields a and b are encoded into the video image frame for display. Once corrected, pixel values are entered into the display. The next step is to ascertain whether another pixel is available within the "edge" for processing, as illustrated. Should there be a pixel available on the "edge," the process recommences for the available pixel. Alternatively, should the correction for the "edge" be complete and no pixels remain for processing, the filtering methodology halts recursive statistical computations until another "edge" is selected for processing.

Another process for filtering "edge" corrections includes applying statistical computations to selected pixels to identify any "edge" corrections to be performed. Such statistical computation is performed recursively until every pixel in an "edge" has been assessed and where necessary, corrected. Preferable recursive statistical computations to calculate corrected YUV vector values for a given pixel 'n' in a selected "edge" field a corresponding to "edge" field b include:
(1) the absolute difference of YUV vector values in the nth pixel between fields a and b;
(2) the sum of the YUV vector values in the nth pixel in field a and double the YUV vector values in corresponding nth pixel in field b; and
(3) the multiplication of the calculated sums for each individual YUV vector value by one-third.

The generated statistical computation (1) for YUV vector values in the nth pixel is preferably applied to an established threshold value. Should absolute difference amounts in individual YUV values fall within the established threshold values based on human perception, no "edge" correction field is generated, as illustrated, and further pixels in fields a and b are selected for processing. Alternatively, should individual YUV difference values fall outside established threshold YUV values, corrected YUV amounts for given pixels in fields a and b are preferably generated.

Exemplary statistical application steps for calculating an adjusted pixel to correct "edge" distortion include calculating corrected individual YUV values for a given pixel in field a. Such calculation preferably entails taking the sum of individual YUV values for a pixel in field a plus double a corresponding pixel's YUV values in field b. Weighted corrected measures of individual YUV values are preferably determined by multiplying the calculated sum values for individual YUV by one-third (⅓). Such computation captures pixel YUV values in field b to be contributed to the correction of given pixel in field a.

Further correction of noise distortion may be enabled by calculating corrected individual YUV values for a given corresponding pixel in field b. Such calculation preferably entails taking the sum of individual YUV values for a pixel in field b plus double a corresponding pixel's YUV values in field a. Such calculation preferably references an original image frame, as copied, to ensure accurate "edge" correction. The weighted corrected measures of individual YUV values for a pixel in field b are preferably determined by multiplying the calculated sum values for individual YUV by one-third (⅓). Such computation captures pixel YUV values in field a to be contributed to the correction of given pixel in field b.

The resulting weighted corrected measures of individual YUV values for corresponding pixels in fields a and b are encoded into the video image frame for display. Once corrected pixel values are entered into the display, the next step is to ascertain whether another pixel is available within the "edge" for processing. Should there be a pixel available on the "edge," the process recommences for such pixel. Alternatively, should the correction for the "edge" be complete and no pixels remain for processing, the filtering methodology halts recursive statistical computations until another "edge" is selected for processing.

A "temporal" correction step to ensure consistency in resolution between video representation frames may also be applied. "Edge" pixels, processed either in the previous noise correction filter or edge correction filter, are categorized into frames i and i+1 to denote contiguous frames in an interlaced sequence of video frames. Each nth pixel in a selected "edge" is in frame i or i+1; wherein each nth pixel has delineated YUV values to create a plurality of colors. YUV values respectively represent red, green, and blue phosphor colors having varying intensities. Preferable recursive statistical computation to calculate corrected YUV vector values for a given nth pixel in a selected "edge" field in frame i or i+1 include:
(1) the absolute difference of YUV values in corresponding nth pixels between frames i and i+1;
(2) the sum of the YUV vector values in the nth pixel in frame i and double the R, G., B vector values in the corresponding nth pixel in frame i+1; and
(3) the multiplication of the calculated sums for each individual YUV vector value by one-third.

Generated statistical computation (1) for YUV values in the nth pixel between frames i and i+1 is preferably applied to established threshold R, G, and B values. Should absolute difference amounts in individual YUV values fall within the established threshold values based on human perception, no "edge" correction field is generated, as illustrated, and further pixels in frames i and i+1 are selected for processing. Alternatively, should individual YUV difference values fall outside established threshold YUV values, corrected YUV amounts for given pixels in frame i+1 are preferably generated.

An exemplary statistical application step for calculating an adjusted pixel to correct temporal distortion includes calculating corrected individual R,G, B values for a given pixel in frame i+1. Such calculation preferably entails taking the sum of individual YUV values for a pixel in frame i+1 plus double a corresponding pixel's YUV values in frame i. Weighted corrected measures of individual YUV values are preferably determined by multiplying the calculated sum values for individual YUV by one-third (⅓). Such computation captures pixel R, G, and B values in frame i to be contributed to the correction of given pixel in frame i+1.

The resulting weighted corrected measures of individual YUV values for pixels in frames i+1 are encoded into the video image frame i+1 for display. Once corrected pixel values are entered into the display, the next step is to ascertain whether another pixel is available within the "edge" for processing. Should there be a pixel available on the "edge," the process recommences for such pixel. Alternatively, should the correction for the "edge" be complete and no pixels remain for processing, the filtering methodology halts recursive statistical computations until another "edge" is selected for processing.

Using the foregoing methods, it is not necessary to address every pixel in the image, but only those within detected fundamental blocks that are subject to a block-specific correction and those outside of a predetermined threshold. The methodology enables image correction in real-time. Coupled with the change in images per second, and the aliasing effects of analog video, the methodology of the present invention yields a much more natural looking image to the eye.

Since the methodology of the present invention is not dependent upon a particular codec, it can be applied to correct video encoded according to many different standards such as MPEG-1, MPEG-2 and any other DCT-based compression. Application to other compression methods may require changing block scan sizes, locations, and thresholds being applied to the decoded video data, all of which may be readily determined by those skilled in the art.

This detailed description of a particular preferred embodiment, set forth above to enable one to practice the invention, is not intended to limit the invention, but to provide particular examples thereof. Those skilled in the art should appreciate that they can readily use the concepts and specific embodiment disclosed as a basis for modifying or designing other methods and systems for carrying out the same purposes of the present invention. Those skilled in the art should also realize that such equivalent methods and systems do not depart from the spirit and scope of the invention.

The invention claimed is:

1. A method for enhancing digital video, said method comprising steps of
    identifying one or more fundamental DCT blocks of decoded video data, said step of identifying one or more fundamental DCT blocks including determining whether a block of decoded digital video data exhibits inverted luminance and then determining if the block is a vertical fundamental block, or a horizontal fundamental block, or a diagonally combined block and
    determining whether a block-specific error correction should be applied to the one or more fundamental DCT blocks, and if it is determined that a block-specific error correction should be applied, then, applying a block-specific error correction to correct the artifact attributed to the one or more fundamental DCT blocks for which it is determined that a block-specific error correction should be applied.

2. A method for enhancing digital video according to claim 1, wherein said step of determining whether a block-specific error correction should be applied to the one or more fundamental DCT blocks further includes determining whether an identified fundamental block is adjacent to another identified fundamental block.

3. A method for enhancing digital video according to claim 2, wherein the step of determining whether a block-specific error correction should be applied to the one or more fundamental DCT blocks further comprises determining whether a difference between adjacent fundamental blocks meets determined threshold criterion for block-specific error correction.

4. A method for enhancing digital video according to claim 3, wherein the step of applying a block-specific error correction includes a step of applying one or more corrections from the group consisting of a standing block correction, an adjacent block correction and a diagonal block correction.

5. A method for enhancing digital video according to claim 4 wherein the time for enhancing a frame of the digital video is 0.033 seconds or less.

6. A method for enhancing digital video according to claim 1, said method further comprising a step of applying one or more global corrections.

7. A method for enhancing digital video according to claim 6, wherein said one or more global corrections includes edge corrections.

8. A system for enhancing digital video, said system comprising means for identifying one or more fundamental DCT blocks of decoded video data that are possible sources of artifacts, said means for identifying one or more fundamental DCT blocks being adapted to determine whether a block of decoded digital video data exhibits inverted luminance and then determine if the block is a vertical fundamental block, or a horizontal fundamental block, or a diagonally combined block; and
    means for determining whether a block-specific error correction should be applied to the one or more fundamental DCT blocks, and, means for applying a block-specific error correction to correct the artifact attributed to any of the one or more fundamental DCT blocks for which it is determined that a block-specific error correction should be applied.

* * * * *